(No Model.) 2 Sheets—Sheet 1.

F. E. KINSMAN.
ICE HARVESTING MACHINE.

No. 445,896. Patented Feb. 3, 1891.

WITNESSES:
Frank S. Ober
Thomas K. Trenchard

INVENTOR
Frank E. Kinsman
BY
W. B. Johnston
ATTORNEY.

(No Model.) 2 Sheets—Sheet 2.
F. E. KINSMAN.
ICE HARVESTING MACHINE.
No. 445,896. Patented Feb. 3, 1891.
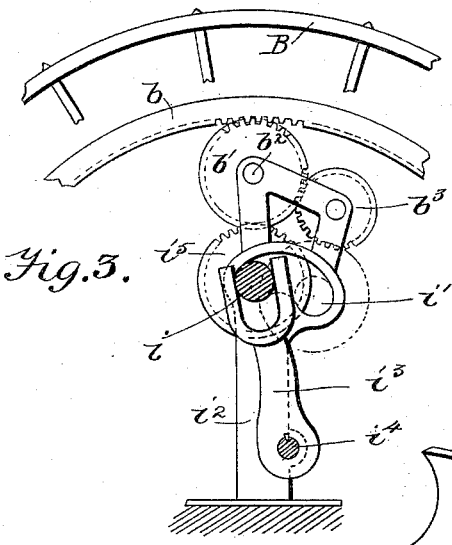
Fig. 3.
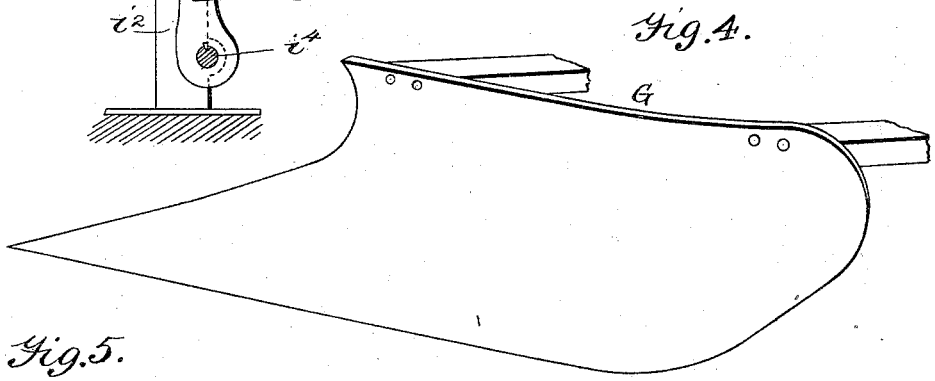
Fig. 4.
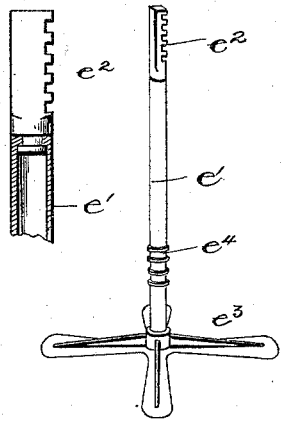
Fig. 5.
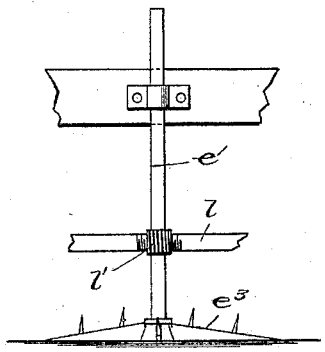
Fig. 6.
WITNESSES:
Frank S. Ober
Thomas K. Trenchard
INVENTOR
Frank E. Kinsman,
BY 
ATTORNEY.
THE NORRIS PETERS CO., PHOTO-LITHO., WASHINGTON, D. C.

UNITED STATES PATENT OFFICE.

FRANK E. KINSMAN, OF PLAINFIELD, NEW JERSEY.

ICE-HARVESTING MACHINE.

SPECIFICATION forming part of Letters Patent No. 445,896, dated February 3, 1891.

Application filed March 1, 1890. Serial No. 342,229. (No model.)

*To all whom it may concern:*

Be it known that I, FRANK E. KINSMAN, a citizen of the United States, residing in Plainfield, in the county of Union and State of New Jersey, have invented certain new and useful Improvements in Ice-Harvesting Machines, of which the following is a specification.

This invention has reference to ice-harvesting machines in the form of a vehicle propelled by an electric motor and carrying cutters which are also driven by the same motor.

The invention may or may not be combined with the electric ice-harvesting machine patented by me October 15, 1889, No. 412,925.

By this invention I provide an electrically-operated machine for smoothing the ice and removing snow by means of a series of ice-planing knives which are used to plane off the surface of the ice in case the same is rough or rotten and a collecting-box and snow plow or guides for gathering up the loose fragments of ice and snow which have been planed off by the planers mentioned.

Figure 1:
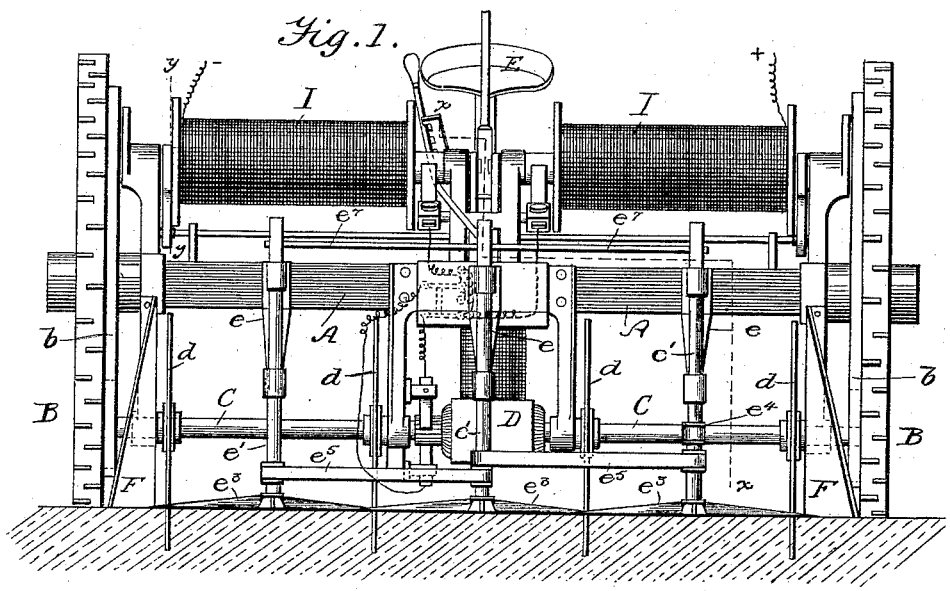
Figure 2:
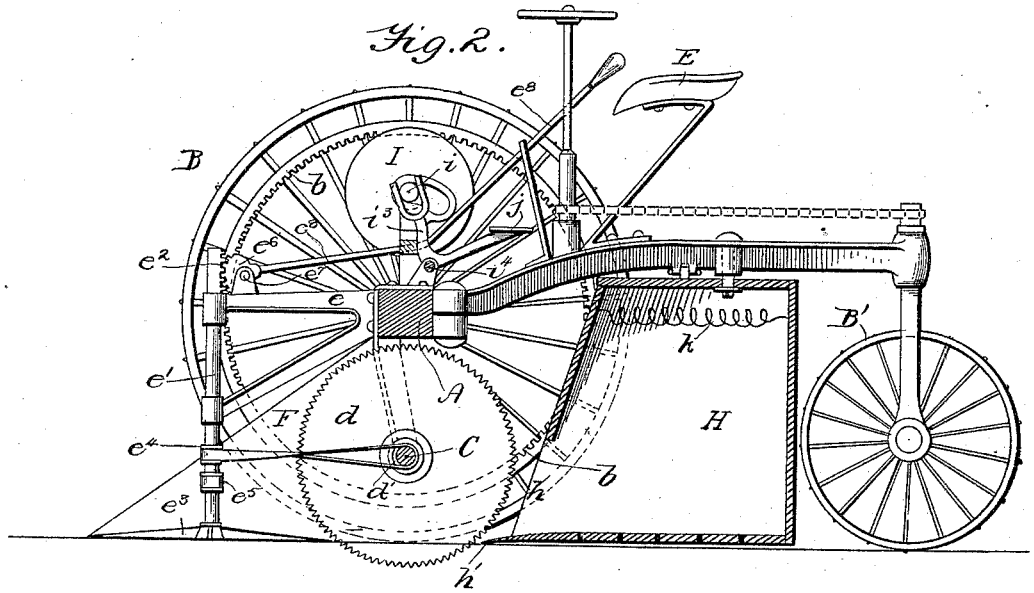

Referring to the accompanying drawings, Figure 1 represents a front elevation of the complete machine. Fig. 2 represents a section taken on line $x\,x$ of Fig. 1. Fig. 3 represents a detail of the reversing-gear. This figure is a section along the line $y\,y$ of Fig. 1. Fig. 4 is a perspective view of a snow-plow. Fig. 5 shows details of a planer-knife, and Fig. 6 the details of another form of planer-knife and method of driving.

In Figs. 1 and 2 I show portions of the machine illustrated in my previous patent before referred to.

A represents the main supporting-axle, upon the ends of which are mounted freely the main wheels B B. A rearward extension or backbone connected with the axle carries a third wheel of small diameter, which is used as a steering-wheel.

The main driving-shaft of the machine is represented by C. It is supported beneath the main axle by suitable hangers therefrom. Upon this shaft is mounted the armature of an electric motor D. The frame-work and field-magnets of the motor are supported by the axle in any suitable manner. This armature-shaft extends nearly the full width of the machine between the wheels and carries on one or both ends a pinion which gears with the internal gear $b$ on one or both of the main wheels of the vehicle, and it is in this way that the machine is propelled. This same shaft also carries a series of cutters or knives $d\,d$ of any approved form.

There is attached to the main axle forwardly-extending brackets $e\,e$, each of which carries at its outer ends in suitable bearings a vertical rotatable shaft $e'$, the upper end of which has a rack $e^2$, which is swiveled to the shaft, as shown in Fig. 5. The lower ends of these shafts carry a series of blades $e^3$, which rotate with the shaft and are shaped to smooth or plane the surface of the ice when they are rotated. They may be armed with spurs, as shown in Fig. 6, to break up large pieces of ice. I have shown three of these shafts and planers; but of course I do not limit myself to the number. They should be arranged, however, so that as they rotate the blades on one shaft will intermesh with the blades on the adjacent shaft, thereby insuring that the whole surface between the wheels of the vehicle will be made smooth. The blades may also extend outside the line of the wheels to smooth the way for the wheels. These shafts are driven by means of a belt passing over a pulley $d'$ on the armature-shaft and another pulley $e^4$ on one of the vertical shafts. Then the other vertical shafts are driven by belts $e^5$ from the first-driven vertical shaft. I do not confine myself to any special form of gearing for driving these planers, as the same may be done in several different ways. I have shown another method of driving them in Fig. 6. In this figure a shaft $l$ will extend along close beside each of the vertical shafts and will be provided with a worm which will gear into a gear $l'$ on the shafts. The shaft $l$ may be driven by the motor in any manner. The planers are arranged ahead of the cutting-knives $d$, in order that the whole surface in front of the knives may be clear. The racks $e^2$ are arranged to gear with three gear-segments $e^6$, fixed upon a rock-shaft $e^7$. An operating-lever $e^8$ connects with the rock-shaft, and by means of this an operator seated at E may raise and lower the planing-knives for the purpose of cutting to different depths into the ice or for raising them entirely out of contact therewith. The rapid rotation of these planers will no doubt throw the shaved ice about, and to gather the same I attach to the side frames of the machine, in an angular position, two deflectors F. In case the ice is covered with snow to a greater or less depth I may or may not use a snow plow or deflector G, as shown in Fig. 4. This will be attached to the front of the machine in any suitable manner and will deflect the heaviest portion of the snow from the path of the machine, leaving the smaller deflectors and the snow-box hereinafter described to take care of the rest. Small quantities of snow and hillocks of ice upon the surface of the ice are an objection, as they interfere more or less with the handling of the ice when putting into the store-house, and the several clearing devices herein described will therefore prove an advantage.

In the space between the cutters $d$ and the rear wheel B′, I suspend from the backbone of the machine a box H, the front of which is partially open, as at $h$, and the lower edge terminates in a sharp lip $h'$, which slides along the surface of the ice. As the machine moves along the lip gathers the shaved or loose ice and snow which is deflected into its path by the deflectors F and stores it in the box H, whence it may be removed after it is filled. The box may be heated to melt the snow by an electrical resistance $k$, placed therein and made a part of the electric circuit. The bottom of this box is perforated to allow water to pass off.

In operating an ice-harvesting machine of this general description the vehicle is usually run back and forth in opposite directions, head first. This necessitates that the vehicle should be turned completely around at each end of the line of travel. In the case of an electrically-propelled machine which derives its propelling-current from a generator separate from the vehicle it is necessary that the conducting-wires should be reeled up or unreeled, in accordance as to whether the vehicle approaches or recedes from the point to which the electric conductors are permanently attached or connected.

The machine described in the above-mentioned Letters Patent show the reels upon which the conducting-wires were wound as geared to and rotated by the internal gear $b$ on one or both of the main wheels of vehicle. Now, inasmuch as the vehicle traveling backward and forward upon the ice should always move head first, it is obvious that the direction of rotation of the reels I must be reversed at each end of the line of travel. I accomplish this by means of a device shown in Fig. 3, in which the reel-shaft is represented by $i$, and it is mounted in a curved slot $i'$, formed in the bracket $i^2$. The shaft is grasped in the fork of the lever $i^3$, fixed to a rock-shaft $i^4$. The internal gear $b$ drives a pinion $b'$, which is mounted in a fixed position on the stud $b^2$. This pinion drives continually an idler $b^3$, and is adapted to drive the pinion $i^5$ on the end of the reel-shaft. By means of the rock-shaft and the slotted frame described, however, the shaft $i$ may be thrown into gear with the idler $b^3$. In this way the direction of rotation of the shaft $i$ may be changed at will. The rock-shaft is operated by the treadle $j$.

The above-described construction of the conductor-reels and their operating-gear I do not claim herein, as the same may form the subject-matter of a separate application for patent.

Although I have shown a complete ice-harvesting machine in which is embodied ice cutters and planers, it is quite obvious that I may have the planers on a machine by themselves and driven by an electric motor.

Having thus described my invention, I claim—

1. The combination of a vehicle, a series of rotatable ice-planers carried thereby, and a motor for driving the vehicle and planers.

2. The combination of a vehicle having a vertical bearing, an ice-planer having its shaft fitted to said bearing and rotatable in a horizontal plane, and means for driving the vehicle and planer.

3. In an ice-harvesting machine, the combination, with the frame thereof supported on traction-wheels and a motor for propelling the machine, of a series of ice-planers having blades extending in a horizontal plane, substantially as described.

4. In an ice-harvesting machine, the combination, with a series of planers having blades extending and rotatable in a horizontal plane, of spurs carried on the upper surface of the blades and means for rotating said planes, substantially as described.

5. The combination of a vehicle and a motor for propelling it, a series of rotary ice-planers, and means for regulating the depth of cut of the planers.

6. In an ice-cutting machine, the combination of a series of ice-cutters and a series of ice-planers, the latter located ahead of the former and consisting of blades rotating in a horizontal plane, the blades of one cutter intermeshing with the blades of the other, for the purpose described.

7. The combination, with an ice-cutting machine, of a box for gathering loose snow and ice, said box having a perforated bottom to allow melted products to escape.

8. The combination, with a movable frame, of a box having an open front provided with a scraping-edge, the bottom of the box being perforated to allow water to escape, and means for heating the box, substantially as described.

9. The combination, in an ice-harvesting machine, of planers for smoothing the ice, a box for gathering loose snow and ice, and deflectors located between the planers and box for guiding the result of the action of the planers into the box, substantially as described.

10. In an ice-harvester, the combination, with ice-planing mechanism, of a separate and independent box located behind said mechanism for gathering snow and ice loosened by it, substantially as described.

In witness whereof I have hereunto signed my name in the presence of two subscribing witnesses.

FRANK E. KINSMAN.

Witnesses:
WM. A. ROSENBAUM,
THOMAS K. TRENCHARD.